United States Patent [19]
Parkes

[11] Patent Number: 5,374,852
[45] Date of Patent: Dec. 20, 1994

[54] MOTOR VEHICLE HEADLIGHT ACTIVATION APPARATUS FOR INCLEMENT WEATHER CONDITIONS

[76] Inventor: Walter B. Parkes, P.O. Box 117, Hancocks Bridge, N.J. 08038

[21] Appl. No.: 122,670

[22] Filed: Sep. 17, 1993

[51] Int. Cl.⁵ .................. B60L 1/14; H01H 47/24; B60Q 1/02
[52] U.S. Cl. .................. 307/10.8; 307/10.1; 315/82; 315/77; 361/175
[58] Field of Search ............ 307/10.8, 10.1, 9.1, 307/117; 315/77, 82, 83; 318/446, DIG. 2; 361/173–175, 160; 200/61.54

[56] References Cited

U.S. PATENT DOCUMENTS

| | | | |
|---|---|---|---|
| 4,968,895 | 11/1990 | Leclercq | 307/10.8 |
| 4,985,660 | 1/1991 | Cronk | 315/82 |
| 5,027,001 | 6/1991 | Torbert | 307/10.1 |
| 5,030,884 | 7/1991 | Roussey et al. | 315/83 |
| 5,120,981 | 6/1992 | Cope | 307/10.8 |
| 5,168,196 | 12/1992 | Briggette, Sr. et al. | 315/82 |
| 5,187,383 | 2/1993 | Taccetta et al. | 307/10.8 |

*Primary Examiner*—A. D. Pellinen
*Assistant Examiner*—Aditya Krishnan
*Attorney, Agent, or Firm*—Rhodes & Ascolillo

[57] ABSTRACT

A lighting control apparatus for a motor vehicle, the motor vehicle having an electrical power supply, an ignition switch, lights, a lighting control switch for illuminating the lights, a wiper device, and a wiper control switch for actuating the wiper device, the lighting control apparatus automatically illuminating the lights whenever the wiper device is actuated, the lighting control apparatus including a photosensitive element electrically connected in series between the electrical power supply and the lights, the photosensitive element being illuminated by ambient light, the photosensitive element having a first substantially conductive state whenever the intensity of the ambient light is below a first threshold value, the photosensitive element additionally having a second substantially nonconductive state whenever the intensity of the ambient light exceeds a second threshold value, a shutter member movable between a first position substantially shielding the photosensitive element from the ambient light and a second position substantially exposing the photosensitive element to the ambient light, and a movement mechanism for moving the shutter member to the first position substantially shielding the photosensitive element from the ambient light whenever the wiper control switch actuates the wiper device.

9 Claims, 1 Drawing Sheet

MOTOR VEHICLE HEADLIGHT ACTIVATION APPARATUS FOR INCLEMENT WEATHER CONDITIONS

BACKGROUND

1. Field of the Invention

The present invention relates to the field of motor vehicle safety devices, most particularly devices that are designed to automatically illuminate the headlights of a motor vehicle during rain.

2. Description of the Related Art

U.S. Pat. No. 5,120,981 relates to a switching system for automatically turning on the headlights of a motor vehicle when the windshield wiper is turned on, the switching system including either relays or digital logic to perform the switching function.

U.S. Pat. No. 5,030,884 relates to a daytime running light circuit for a motor vehicle that illuminates the headlights at reduced intensity when the vehicle is operating and the headlight switch is in an off position.

U.S. Pat. No. 5,027,001 relates to an automatic system for activating vehicle headlights upon the actuation of a windshield wiper, wherein the wipers are automatically activated when moisture is sensed on the windshield, the wiping cycle being stopped when the windshield is no longer wet and the headlights remaining on for a short time thereafter.

U.S. Pat. No. 4,985,660 relates to circuitry for automatically turning on vehicle lights whenever the wipers are turned on, the circuitry including a double-pole single-throw relay switch positioned between the ignition switch and the light switch.

U.S. Pat. No. 4,968,895 relates to a laminated glass windshield that includes a photosensitive element which is buried in a plastic interlayer between two exterior glass sheets, and an electric circuit for use with the photosensitive element for automatically turning on and off the lights of a motor vehicle whenever the ambient light crosses a threshold level.

SUMMARY OF THE INVENTION

During rainy, foggy or other inclement weather, whenever the windshield wipers of a motor vehicle are operated, it is often, if not usually, advisable to simultaneously activate the headlights (and, perhaps, other vehicle lights), in order to provide greater visibility to other motorists. However, motorists often fail or forget to activate their headlights at such times, particularly during daylight hours.

Additionally, some states may require that the headlights of a motor vehicle be activated whenever the weather conditions are severe enough to require use of the windshield wipers.

Moreover, motorists are often forgetful of turning on their headlights at dusk, and turning them off at dawn or when exiting from an artificially darkened situation, such as the emergence from a tunnel, etc.

Accordingly, one object of the present invention is the provision of an apparatus for automatically illuminating the headlights (and, optionally, other lights, such as parking lights, etc.) of a motor vehicle, whenever the windshield wipers of the motor vehicle are turned on.

Another object of the invention is the provision of such an apparatus which will simultaneously, in conjunction with the above-described function of automatically illuminating the headlights upon activation of the wipers, automatically illuminate the headlights of the vehicle whenever the ambient light falls below a threshold value and deactivate the headlights whenever the ambient light exceeds a threshold value.

A still further object of the invention is the provision of such an apparatus that in simple in operation and construction and therefore inexpensive to manufacture.

In one aspect, the invention generally features a lighting control apparatus for a motor vehicle, the motor vehicle having an electrical power supply, an ignition switch, lights, a lighting control switch for illuminating the lights, a wiper device, and a wiper control switch for actuating the wiper device, the lighting control apparatus automatically illuminating the lights whenever the wiper device is actuated, the lighting control apparatus including: a photosensitive element electrically connected in series between the electrical power supply and the lights; the photosensitive element being illuminated by ambient light; the photosensitive element having a first substantially conductive state whenever the intensity of the ambient light is below a first threshold value; the photosensitive element additionally having a second substantially nonconductive state whenever the intensity of the ambient light exceeds a second threshold value; a shutter member movable between a first position substantially shielding the photosensitive element from the ambient light and a second position substantially exposing the photosensitive element to the ambient light; and a movement mechanism for moving the shutter member to the first position substantially shielding the photosensitive element from the ambient light whenever the wiper control switch actuates the wiper device.

Preferably, the movement mechanism includes a solenoid electrically connected to the wiper control switch.

In another aspect, the invention generally features a lighting control apparatus for a motor vehicle, the motor vehicle including a battery, an ignition switch, headlights, a light control switch for supplying the headlights with electrical power from the battery, a wiper device, and a wiper control switch for supplying the wiper device with electrical power from the battery, the lighting control apparatus automatically illuminating the headlights whenever the wiper device is actuated, the lighting control apparatus including: a photosensitive element positioned so as to be exposed to ambient light; the photosensitive element having a first substantially conducting state whenever the intensity of the ambient light is less than a first threshold value; the photosensitive element having a second substantially nonconducting state whenever the intensity of the ambient light exceeds a second threshold value; a shutter member positioned adjacent to the photosensitive element: the shutter member being movable between a first position wherein the shutter member substantially shields the photosensitive element from the ambient light and a second position wherein the shutter member substantially exposes the photosensitive element to the ambient light; a movement mechanism for moving the shutter member between the first and second positions; a first electrical circuit for supplying the headlights with electrical power from the battery, the first electrical circuit extending from the battery, through the light control switch, and to the headlights; a second electrical circuit for supplying the headlights with electrical power from the battery, the second electrical circuit extending from the battery, through the photosensitive element, and to the headlights; and an electrical connection between the wiper control switch and the movement mechanism for energizing the movement mechanism to thereby move the shutter to the first position whenever the wiper control switch actuates the wiper device.

Preferably, the first and second electrical circuits are parallel electrical circuits for supplying the headlights with electrical power from the battery; the first electrical circuit additionally extends through the ignition switch; the second electrical circuit additionally extends through the ignition switch; the movement mechanism includes a solenoid; and the wiper device includes a wiper motor, mechanism for actuating the wiper motor at a high speed, mechanism for actuating the wiper motor at a low speed, and mechanism for actuating the wiper motor at delayed intervals.

In yet another aspect, the invention generally features a lighting control apparatus for a motor vehicle, the motor vehicle having an electrical power source, an ignition system, an ignition switch for electrically connecting the ignition system to the electrical power source, headlights, a light control switch for electrically connecting the headlights to the electrical power source, a wiper device, and a wiper control switch for electrically connecting the wiper device to the electrical power source, the lighting control apparatus automatically illuminating the headlights whenever the wiper device is actuated, the lighting control apparatus including: a photosensitive element positioned so as to be exposed to ambient light; the photosensitive element being electrically connected in series between the ignition switch and the headlights; the photosensitive element having a first substantially conductive state whenever the ambient light falls below a first threshold value; the photosensitive element having a second substantially nonconductive state whenever the ambient light exceeds a second threshold value; a substantially opaque shutter member positioned adjacent the photosensitive element; the shutter member being movable between a first position wherein the shutter member substantially shields the photosensitive element from the ambient light and a second position wherein the shutter member substantially exposes the photosensitive element to the ambient light; a solenoid connected to the shutter member; and an electrical connection between the wiper control switch and the solenoid for electrically connecting the solenoid with the electrical power source whenever the wiper control switch electrically connects the wiper device to the electrical power source.

The invention will now be described by way of a particularly preferred embodiment, reference being made to the accompanying drawings, wherein:

DESCRIPTION OF THE PREFERRED EMBODIMENT

Figure 1:
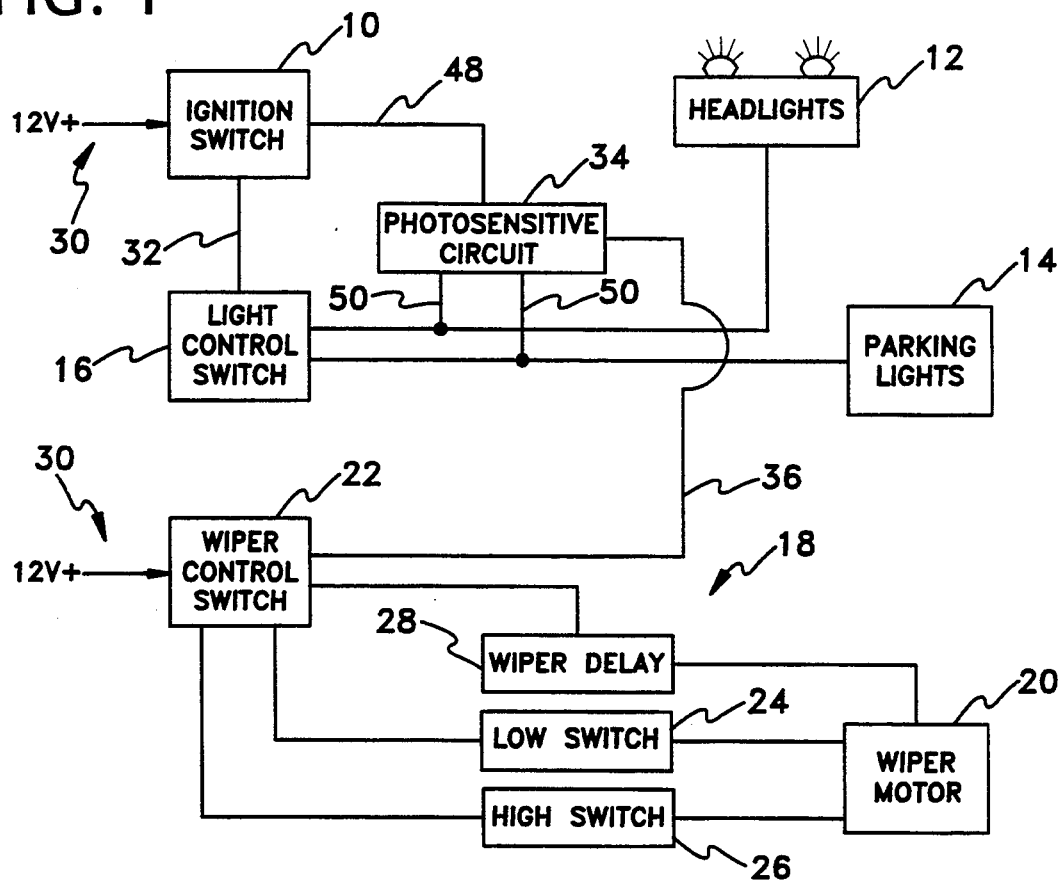
FIG. 1 is a schematic diagram of the ignition switch, light circuit, and wiper circuit of a motor vehicle equipped with an apparatus for automatically illuminating the headlights, parking lights, etc. of the vehicle according to the present invention.

FIG. 1 shows, in schematic block diagram form, a lighting control apparatus constructed according to the present invention for automatically illuminating the lights (e.g., headlights, parking lights, etc.) of a motor vehicle. The motor vehicle includes an ignition switch 10, headlights 12, parking lights 14, a light control switch 16 of a type well known in the art that can illuminate either the headlights 12, the parking lights 14, or both, and a wiper device 18, for example, windshield wipers and/or a rear window wiper, the wiper device 18 itself including a wiper motor 20 and a wiper control switch 22 for actuating the wiper motor 20. The wiper device 18 may also include a variable speed wiper actuation device consisting of a low speed wiper switch 24, a high speed wiper switch 26, and a wiper delay switch 28, which permit the wiper motor 20 to be selectively actuated at either a low speed, a high speed, or at delayed intervals, as is well understood in the art.

The motor vehicle additionally includes an electrical power supply, most commonly a twelve volt D.C. automotive battery 30, one terminal of which (normally the positive terminal) is connected to the lights, that is, the headlights 12 and the parking lights 14, through the light control switch 16, and to the wiper motor 20 through the wiper control switch 22 (and optionally through the low speed switch 24, the high speed switch 26, and the wiper delay switch 28, if present). In the embodiment shown in FIG. 1, the 12 volt D.C. battery 30 is illustrated as supplying voltage and current directly to only the ignition switch 10 and the wiper control switch 22, with the light control switch 16 receiving its power indirectly through the ignition switch 10 via a connection 32. However, it will be understood by those of ordinary skill in the art that a 12 volt battery connection can be readily made directly to the light control switch 16.

According to the invention, a photosensitive circuit 34 is positioned on the motor vehicle in such a location that it will be struck and illuminated by the general ambient light conditions to which the motor vehicle is exposed. The photosensitive circuit 34 is electrically connected in series between the 12 volt supply from the battery 30 and the lights, preferably both the headlights 12 and the parking lights 14. Thus, the photosensitive circuit 34 forms an electrical circuit that is in parallel to the light control switch 16, whereby the headlights 12 and the parking lights 14 can be illuminated (that is, turned on) via either the light control switch 16 or the photosensitive circuit 34. It is to be understood that, rather than being connected to the 12 volt supply of the battery 30 indirectly through the ignition switch 10, the photosensitive circuit 34 could instead be connected to the 12 volt supply of the battery 30 directly.

Additionally, according to the invention, a control connection 36 is provided between the wiper control switch 22 and the photosensitive circuit 34, the control connection 36 being energized with the 12 volt supply of the battery 30 whenever the wiper control switch 22 actuates the wiper motor 20, whether through the low speed switch 24, the high speed switch 26, or the wiper delay switch 28.

Figure 2:
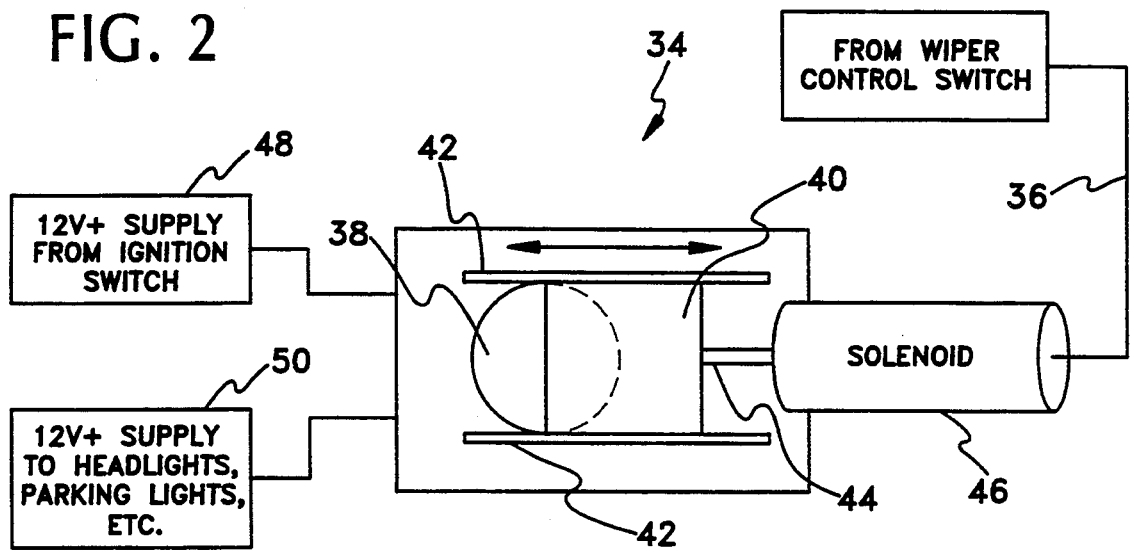
FIG. 2 is a schematic diagram of a photosensitive circuit and an accompanying solenoid used in the apparatus of FIG. 1.

The photosensitive circuit 34, which is shown in more detail in FIG. 2, includes a photosensitive element 38 that has a first state wherein the photosensitive element 38 is substantially conductive when the intensity of light falling thereon is below a first threshold value, and a second state wherein the photosensitive element 38 is substantially nonconductive whenever the intensity of light falling thereon exceeds a second threshold value. Such photosensitive elements are well known in the art and are described, for example, in U.S. Pat. No. 4,968,895 issued on Nov. 6, 1990 to Leclercq and entitled "Laminated Glass with Photosensitive Element and Automatic Device for Turning On and Off Lights of a Motor Vehicle," this issued U.S. Patent hereby being expressly incorporated by reference, with the same effect as if the entire contents thereof were fully set forth herein.

The photosensitive circuit 34 additionally includes a shutter member 40 slidingly mounted between a pair of parallel tracks 42, such that the shutter member 40 can be disposed in either a first position to substantially shield the photosensitive element 38 from the ambient light, or a second position to substantially expose the photosensitive element 38 to the ambient light. The shutter member 40 is connected to a piston rod 44 of a solenoid 46 which acts to move the shutter member 40 laterally between the first and second positions, the solenoid 46 being actuated to move the shutter member 40 into the first position, wherein the photosensitive element 38 is substantially shielded from the ambient light, whenever the solenoid 46 is energized by the control connection 36 extending between the wiper control switch 22 and the solenoid 46. Additionally, the photosensitive circuit 34 is provided with an input 48 from the 12 volt supply of the battery 30 (preferably via the ignition switch 10) and an output 50 to the lights of the motor vehicle (e.g., the headlights 12, the parking lights 14, etc.).

In operation, the light control apparatus functions as follows: Whenever the wiper device 18 is actuated via the wiper control switch 22, a control signal (for example, a 12 volt current from the battery 30) is transmitted to the solenoid 46 over the control connection 36, thereby energizing the solenoid 46 and causing the shutter member 40 to move to the left in FIG. 2, thereby substantially reducing the ambient light falling on the photosensitive element 38, which becomes conductive and electrically connects the lights of the motor vehicle (e.g., the headlights 12, the parking lights 14, etc.) to the 12 volt supply of the battery 30, thereby illuminating the vehicle lights. The vehicle lights are thus automatically illuminated whenever the wiper device 18 is actuated, regardless of the ambient lighting conditions. Additionally, during those times when the wiper device 18 is inactive, the photosensitive circuit 34 functions to automatically illuminate the vehicle lights whenever the ambient light falls below the first threshold level (e.g., at dusk), and to turn off the vehicle lights whenever the ambient light exceeds the second threshold level (e.g., at dawn). Still further, the vehicle lights can be conventionally illuminated via the light control switch 16 at all times.

While the invention has been herein described by way of a particular preferred embodiment, various substitutions of equivalents may be effected without departing from the spirit and scope of the invention as set forth in the following claims.

What is claimed is:

1. A lighting control apparatus for a motor vehicle, said motor vehicle having an electrical power supply, an ignition switch, lights, a lighting control switch for illuminating said lights, a wiper device, and a wiper control switch for actuating said wiper device, said lighting control apparatus automatically illuminating said lights whenever said wiper device is actuated, said lighting control apparatus comprising:

a photosensitive element electrically connected in series between said electrical power supply and said lights;

said photosensitive element being illuminated by ambient light;

said photosensitive element having a first substantially conductive state whenever the intensity of said ambient light is below a first threshold value;

said photosensitive element additionally having a second substantially nonconductive state whenever said intensity of said ambient light exceeds a second threshold value;

a shutter member movable between a first position substantially shielding said photosensitive element from said ambient light and a second position substantially exposing said photosensitive element to said ambient light; and movement means for moving said shutter member to said first position substantially shielding said photosensitive element from said ambient light whenever said wiper control switch actuates said wiper device.

2. A lighting control apparatus according to claim 1, wherein said movement means comprises a solenoid electrically connected to said wiper control switch.

3. A lighting control apparatus for a motor vehicle, said motor vehicle including a battery, an ignition switch, headlights, a light control switch for supplying said headlights with electrical power from said battery, a wiper device, and a wiper control switch for supplying said wiper device with electrical power from said battery, said lighting control apparatus automatically illuminating said headlights whenever said wiper device is actuated, said lighting control apparatus comprising:

a photosensitive element positioned so as to be exposed to ambient light;

said photosensitive element having a first substantially conducting state whenever the intensity of said ambient light is less than a first threshold value;

said photosensitive element having a second substantially nonconducting state whenever the intensity of said ambient light exceeds a second threshold value;

a shutter member positioned adjacent to said photosensitive element;

said shutter member being movable between a first position wherein said shutter member substantially shields said photosensitive element from said ambient light and a second position wherein said shutter member substantially exposes said photosensitive element to said ambient light;

movement means for moving said shutter member between said first and second positions;

a first electrical circuit for supplying said headlights with electrical power from said battery, said first electrical circuit extending from said battery, through said light control switch, and to said headlights;

a second electrical circuit for supplying said headlights with electrical power from said battery, said second electrical circuit extending from said battery, through said photosensitive element, and to said headlights; and an electrical connection between said wiper control switch and said movement means for energizing said movement means to thereby move said shutter to said first position whenever said wiper control switch actuates said wiper device.

4. A lighting control apparatus according to claim 3, wherein said first and second electrical circuits comprise parallel electrical circuits for supplying said headlights with electrical power from said battery.

5. A lighting control apparatus according to claim 4, wherein said first electrical circuit additionally extends through said ignition switch.

6. A lighting control apparatus according to claim 5, wherein said second electrical circuit additionally extends through said ignition switch.

7. A lighting apparatus according to claim 6, wherein said movement means comprises a solenoid.

8. A lighting control apparatus according to claim 7, wherein said wiper device comprises a wiper motor, means for actuating said wiper motor at a high speed, means for actuating said wiper motor at a low speed, and means for actuating said wiper motor at delayed intervals.

9. A lighting control apparatus for a motor vehicle, said motor vehicle having an electrical power source, an ignition system, an ignition switch for electrically connecting said ignition system to said electrical power source, headlights, a light control switch for electrically connecting said headlights to said electrical power source, a wiper device, and a wiper control switch for electrically connecting said wiper device to said electrical power source, said lighting control apparatus automatically illuminating said headlights whenever said wiper device is actuated, said lighting control apparatus comprising:

a photosensitive element positioned so as to be exposed to ambient light;

said photosensitive element being electrically connected in series between said ignition switch and said headlights;

said photosensitive element having a first substantially conductive state whenever said ambient light falls below a first threshold value;

said photosensitive element having a second substantially nonconductive state whenever said ambient light exceeds a second threshold value;

a substantially opaque shutter member positioned adjacent said photosensitive element;

said shutter member being movable between a first position wherein said shutter member substantially shields said photosensitive element from said ambient light and a second position wherein said shutter member substantially exposes said photosensitive element to said ambient light;

a solenoid connected to said shutter member; and an electrical connection between said wiper control switch and said solenoid for electrically connecting said solenoid with said electrical power source whenever said wiper control switch electrically connects said wiper device to said electrical power source.

* * * * *